United States Patent [19]
Hanselmann et al.

[11] 3,825,707
[45] July 23, 1974

[54] SWITCHING DEVICE FOR INDICATING THE LOADING OF A VEHICLE SEAT

[75] Inventors: Dieter Hanselmann; Hans Prohaska, both of Bietigheim, Wurttemberg, Germany

[73] Assignee: SWF-Spezialfabrik fur Autozubehor Gustav Rau GmbH, Bietigheim, Germany

[22] Filed: June 8, 1973

[21] Appl. No.: 368,086

Related U.S. Application Data

[63] Continuation-in-part of Ser. No. 255,068, May 19, 1972, abandoned.

[30] Foreign Application Priority Data
May 21, 1971 Germany.......................... 2125198

[52] U.S. Cl............ 200/85 A, 340/278, 200/86 R
[51] Int. Cl................................................ H01h 3/14
[58] Field of Search.......... 200/85 A, 86 R; 340/278

[56] References Cited
UNITED STATES PATENTS
3,694,600   9/1972   Koenig............................. 200/86 R

*Primary Examiner*—David Smith, Jr.
*Attorney, Agent, or Firm*—McGlew and Tuttle

[57] ABSTRACT

A switching device for indicating the loading of a vehicle seat includes a contact assembly comprising two resilient contact bands which are spaced apart by insulation holders and which will flex together upon loading of a seat to actuate an indicating circuit. The contact assembly advantageously comprises a band assembly of a form to be positioned in a major portion of the seat which is loaded by a person occupying the seat and it includes two terminals extending outwardly from the band which are adapted to be simply connected to a circuit for indicating, for example, when the seat is occupied and loaded and when the occupant has not fastened his seat belt. The band assembly may be of a shape such as an O, U, V or Z configuration and extend over a greater part of the surface of a seat and be embedded directly within the seat upholstery or a seat cushion and each band comprises a continuous flat helical spring with successive coils laying flat and being overlapped in contacting relationship. Adjacent bands are bendable upon loading of the seat to permit lateral as well as vertical movement to permit them to be easily displaced together in contacting engagement.

5 Claims, 5 Drawing Figures

SWITCHING DEVICE FOR INDICATING THE LOADING OF A VEHICLE SEAT

CROSS-REFERENCE TO PRIOR APPLICATION

This application is a continuation-in-part of application Ser. No. 255,068, filed on May 19, 1972 now abandoned for switching device for indicating the loading of a vehicle seat.

BACKGROUND OF THE INVENTION

1. Field of the Invention

This invention relates in general to the construction of safety devices for vehicles and, in particular, to a new and useful device for actuating an indicator circuit for indicating the loading of a seat of an automobile.

2. Description of the Prior Art

In order to increase the safety of persons conveyed in vehicles, it has been considered advisable to provide the driver with a signal when a person has occupied a passenger seat and has not yet fastened his safety belt. In order to produce this signal, a switch device is necessary, which is actuated when the automobile vehicle seat is loaded.

The invention relates to a switching device for indicating the loading of a motor vehicle seat or seat cushion, comprising a built-in contact band consisting of two contact strips capable of being deflected and extending in a certain mutual distance assured by spacers of insulating material provided at a plurality of locations.

In such switching devices, it is essential to use a contact band which can be mounted into the seat or seat cushion easily and without any application of material. Moreover, the contact band must be capable of being deflected not only in the contact direction but also transversely thereto, to permit yielding to a deformation of the seat or seat cushion under the load.

There are known contact bands comprising bare electrical conductors located in a rubber tube so as not to contact each other in the rest position. The contact surfaces of the conductors are freely opposed to each other and the conductors are fixed directly to the flexible tube and held apart by means of spacers which are located in the tube at regular distances. Such a contact band has the advantage of being resilient and capable of being arranged in small curved configurations. However, the switching direction is not well-defined because the contact may be established in any direction as a result of the tube deformation. In addition, though the contact may be established by relatively very small forces, the interruption of the contact between the conductors is not clearly defined. That is why such a contact band is not suitable for the sturdy conditions to which a switching device is exposed in a seat or seat cushion. It offers no switching security under heavy loadings of this kind. There is rather a risk of lasting deformations due to such loadings and resulting in a permanent contact.

SUMMARY OF THE INVENTION

The present invention provides a device which is adapted to be incorporated in an automobile seat frame directly within the upholstery thereof or on a separate cushion or seat which may be placed on top of the vehicle seat. The invention provides a switch device for actuating an indicator circuit for indicating the loading of the seat and it includes a contact assembly which is adapted to be disposed adjacent the surface of the seat which comprises at least two resilient contact bands which are flexed when an occupant occupies the seat so that they move into contacting engagement. The bands are connected to terminal elements which extend outwardly from the contact assembly and which provide a simple means for connecting the assembly to an indicating circuit for indicating when the bands are in touching contact and when the seat is loaded. The contact band assembly may be made of any desired configuration which will occupy a sufficient portion of the seat to obtain an indication whenever the seat is occupied. The construction is such that the indicator circuit is actuated even when the seat of the vehicle is unequally loaded. The band assembly is of a type which can be fitted into the seat either during the initial installation of the equipment or subsequently. The contact band assembly comprises two contact strips secured together but insulated from each other at several points by insulating holders which are arranged at spaced locations along the length of the bands. The band assembly is embedded in the seat or seat cushion of the automobile vehicle in a position in which the individual bands will be flexed during the loading of the seat so that they move into contacting engagement.

The invention provides a seat cushion which may be employed for vehicles which have already been manufactured. The seat cushion may be placed on the existing vehicle seat and the two terminals for the contact assembly are easily accessible for quick connection into an indicating system which may be installed in the automobile. Alternatively, the existing seat cushion or a newly formed one may be upholstered or reupholstered to incorporate the contact assembly directly in the seat adjacent the surface thereof so that the individual contact bands will be flexed immediately upon loading of the seat. The two contact strips are divided over their lengths into several contact sections by the provision of insulation spaces which hold them together in spaced parallel relationship. It is immaterial as to which contact section the two contact strips come into connection with each other. The contact strips are made of a resilient electrically conducting flexible metal bands such as flattened helical spring bands or metal coated plastic bands. Normally the two contact strips are aligned parallel to each other by the plastic spacers. The air gap between the contact strips may be increased by forming the contact strips so that they bulge outwardly away from each other between the spacers. The spacers are located so that the closure of the switch by the interengagement of the bands is reliably prevented whenever the seat is unloaded.

The contact bands may be secured to the supports on the seat frame by injection molded plastic spacers which are formed directly on the contact strips. The spacers may be divided into two separate parts which are connected together by locking connections rather than being formed as a single molded spacer unit. In the simplest form the two contact strips may be spaced apart and insulated from each other by a simple winding of adhesive bandage.

The electrical connection of the two contact bands with a monitoring device or indicating circuit is facilitated if the contact terminals for each of the strips extend outwardly from the seat cushion or the upholstery of the vehicle in the form of resilient connecting leads or terminals. Some means for relieving the traction between the contact bands and their connecting terminals leads to prevent overloading of the junctions between them may also be provided. The connecting leads may be attached to the contact strips or to the flexible connecting joint for relieving the traction such as by soldering, welding, pinch fitting or similar means.

The invention provides a switching device showing a definite switching direction, capable of being deflected within certain limits transversely to the seitching direction, and offering a substantially greater switching security under conditions of heavy loadings. In accordance with the invention, the contact strips are provided in the form of flattened helical springs wound of elastic wire of metal band and aligned in the switching direction so as to face each other along their broad sides, and that the two helical springs belonging to a contact band along with their spacers are placed in an envelope of synthetic material and electrically connected to the outside of the seat or seat cushion by flexible connection leads. Owing the arrangement of the contact strips, a definite switching direction is obtained and the contact band can be deflected transversely to the switching direction to follow the deformation of the seat. The resilience of the wound helical spring ensures the opening of the contact upon unloading of the seat and thereby an excellent switching security. The flexible connection leads facilitate the mounting of the switching device itself within the seat cushion.

In accordance with a further development of the invention, the switching device may be simplified by attaching the electrical connection leads to the extremities of the helical springs, preferably by clamping them between successive coils thereof.

Accordingly, it is an object of the invention to provide a device for actuating an indicating circuit for indicating the loading of a seat particularly an automobile seat which comprises a contact assembly which is adapted to be disposed in the seat and which comprises two resilient contact bands each comprising a continuous coil spring and which are held in spaced apart relationship and which include a connecting terminal for each band which is adapted to extend out of the seat for connection to an indicating circuit.

A further object of the invention, is to provide a vehicle seat which includes a contact assembly embedded within the seat and comprising two vertically spaced resilient contact bands formed as flattened continuous coils with adjacent coils overlapped in abutting contact and having connecting terminals for each band extending out of the seat and which will flex upon loading of the seat into contacting engagement.

A further object of the invention, is to provide a device for indicating the loading of an automobile vehicle seat which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
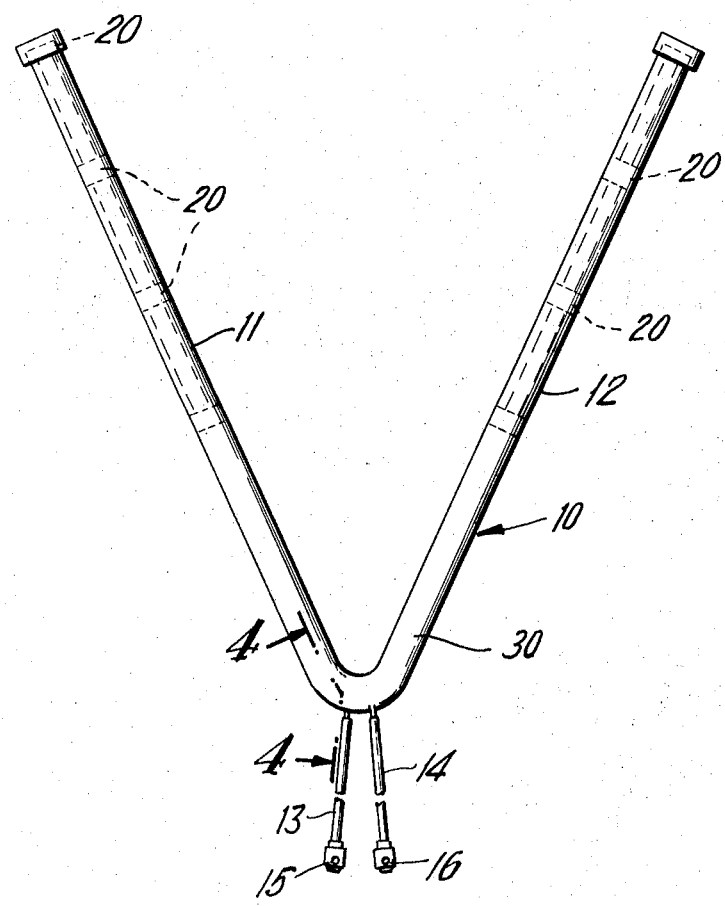
FIG. 1 is a top plan view of a contact assembly for indicating the loading of a seat constructed in accordance with the invention.

Referring to the drawings in particular, the invention embodied therein comprises a device for actuating an indicator circuit for indicating the loading of a seat or contact assembly generally designated 10. The contact assembly generally designated 10 is made of a configuration such that a large area thereof will be disposed for actuation on an automobile vehicle seat and in the embodiment shown it is of V-shaped configuration. The contact assembly 10 includes two vertically spaced or superimposed contact strips or bands 11 and 12 which are held in spaced parallel relationship by a plrality of spaced apart insulator members or spacers 20, of a material such as plastic, and which are arranged along the length of the contacting bands at regular spaced locations, such as at the four locations indicated at FIG. 1.

In accordance with the invention, the contact strips 11 and 12 are resilient metal bands formed of flattened helical band springs with successive coils overlapped and in abutting contact. They are held by the spacers 20 so that they are capable of being deflected fully in all directions so that they can follow the changes of position of the seat cushion of the upholstery of a vehicle seat. The contact band assembly 10 has a series of contact sections which are connected in parallel and which are connected by conductors 13 and 14 to a monitoring device or indicating circuit by connections made to terminals 15 and 16 respectively.

Figure 2:
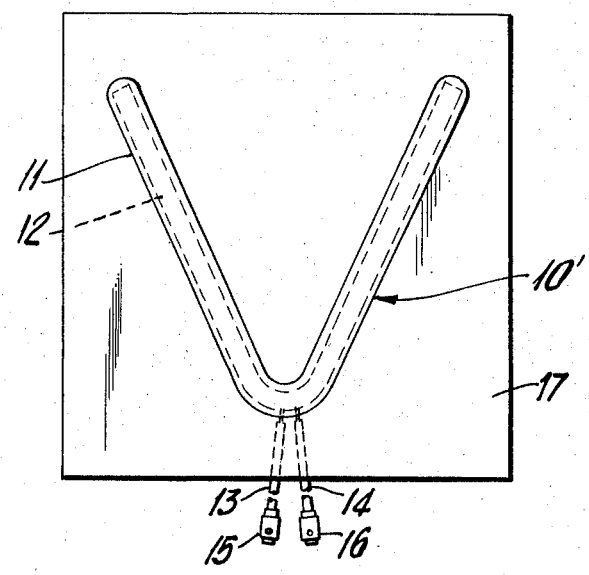
FIG. 2 is a bottom plan view of a seat having the switching device shown in FIG. 1.

In the embodiment shown in FIG. 2, there is provided a seat cushion 17 having a contact assembly 10' embedded therein and a seat may be placed on the seat of an automobile. The connecting leads 13 and 14 with their terminals 15 and 16 extend outwardly from one edge of the seat 17 in a position in which they may be easily connected to a monitoring device or indicatin circuit which is already installed on the automobile. The connecting leads 13 and 14 may be attached to the contact strips similar to the contact strips 11 and 12 by soldering, welding, pinch fitting or similar means. Some means for relieving the traction between the individual flexible bands 11 and 12 and the connecting leads 13 and 14 are provided in order to permit them to flex without loading the connecting leads.

The plastic spacers 20 may be directly applied to the strips 11 and 12 by injection molding or they may be made as separate members in two parts which are connected together by a locking connection. The contact strips may be insulated and kept apart from each other by ordinary adhesive tapes wound around the strips if so desired.

Figure 3:
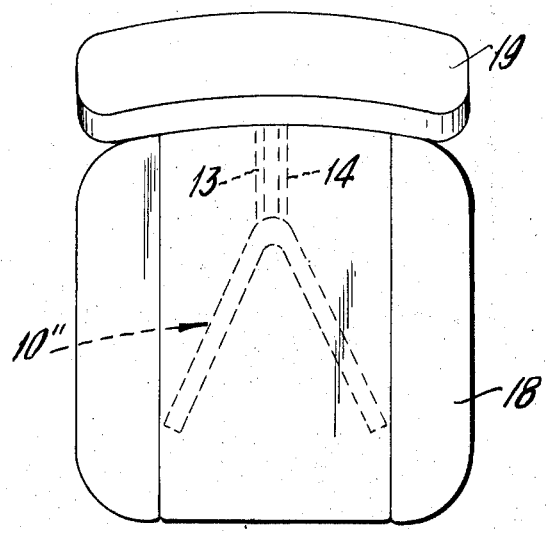
FIG. 3 is a top plan view of a seat indicating orientation of a band therein as constructed in accordance with the invention.

As shown in FIG. 3, a contact assembly generally designated 10" is installed directly within the upholstery 18 of a behicle seat having a back 19. When the seat 18 is loaded the individual flexible bands 11 and 12 of the contact band assembly 10" will come together to cause actuation of the indicating circuit. The operation of such a switch device is particularly reliable when the contact band assembly 10'' extends over a large portion of the surface area of the seat. It is therefore preferable to form the contact band assembly 10, 10' or 10'' in the shape of an O, U, V or Z so that it will extend over a large area of the surface of the seat.

Figure 4:
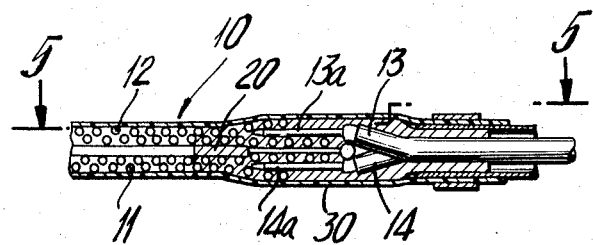
FIG. 4 is a section taken along the line 4—4 of FIG. 1.
Figure 5:
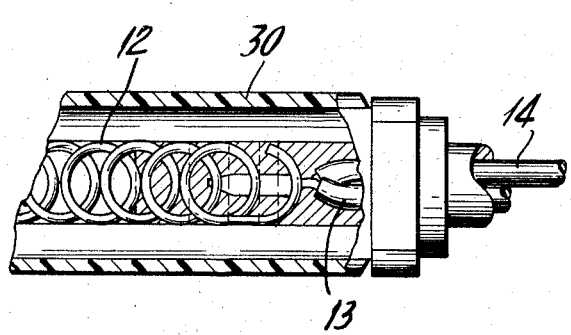
FIG. 5 is a section taken along the line 5—5 of FIG. 4.

As shown in FIGS. 4 and 5, the contact strips or bands 11 and 12 comprise flattened continuous wound helical springs which are coils of elastic wire wound in a continuous operation. According to FIG. 4, the turns of the spring overlap approximately by one-half the diameter of the coils. The two flattened helical spring bands 11 and 12 are kept at the desired spacing by spacers 20 and held so that their broad sides face each other. The switching direction of the contact bands is perpendicular to their broad sides. The individual turns of the helical springs also permit a deflection transversely to the switching direction, i.e. in the plane of the turns. When the helical springs are flexed in the switching direction, a restoring force is produced which, upon unloading of the seat or the seat cushion, assures a definite return of the springs into the initial position. This return is facilitated by the fact that in the switching direction, the smallest moment of resistance is opposed to the motion.

In case the device is mounted in a motor vehicle seat, the possibility is given that the helical springs would come into contact with the springs of the seat. Therefore, the helical springs 11'' and 12'' together with their spacers 20 are placed in a plastic envelope 30.

The insulated end portions of the connecting leads 13 and 14 are clamped in the most simple manner between the turns of the flattened helical springs of the bands 11 and 12 and the electric connection is thereby established.

When mounting the contact bands into a seat cushion or vehicle seat 17 or 18, care is to be taken to dispose the helical springs of the bands 11 and 12 so that their broad sides are approximately parallel to the seat surface. Thereby a contact is established even under a small load and that even under a heavy load, the switching device offers an excellent switching security. The terminals 13 and 14 include interior connector ends 13a and 14a which extend between successive coils of the bands 11 and 12.

While specific embodiments of the invention have been shown and described in detail to illustrate the application of the principles of the invention, it will be understood that the invention may be embodied otherwise without departing from such principles.

What is claimed is:

1. A device for actuating an indicating circuit for indicating the loading of a seat particularly an automobile seat, comprising a contact assembly adapted to be positioned in a seat comprising two eletrically conductive flexible metal contact bands, spacer holders of insulating material arranged at axially spaced locations between said contact bands and supporting said contact bands in spaced apart relationship, said bands each comprising a continuous flat helical spring with successive coils laying flat and overlapped in contacting relationship, spacer means holding said bands in spaced relationship so that they are freely bendable both laterally and toward and away from each other upon loading of the seat to permit them to move together into contacting engagement upon such seat loading, and a connecting terminal connected to each of said bands for connecting each of said bands to the indicating circuit.

2. A device, according to claim 1, including an envelope of synthetic material surrounding said bands, said connecting terminal for each of said bands comprising a separate flexible connection line extending out of said envelope.

3. A device, according to claim 2, wherein said flexible connection lines include inner terminals which extend between successive coils of said bands.

4. A device, according to claim 1, wherein said contact assembly is generally V-shaped.

5. A device, according to claim 4, including an automobile seat cushion, said V-shaped contact assembly being disposed in said seat cushion with the legs of the V-shaped configuration being disposed towards one end of the cushion and the center of the V pointing toward the opposite edge of the cushion, said connecting terminal extending outwardly from the center of said V-shaped contact assembly through adjacent edge of said cushion.

* * * * *